United States Patent
Beers et al.

(10) Patent No.: US 10,264,239 B2
(45) Date of Patent: Apr. 16, 2019

(54) METHOD FOR PRODUCING A DIGITAL PHOTO WHEREIN AT LEAST SOME OF THE PIXELS COMPRISE POSITION INFORMATION, AND SUCH A DIGITAL PHOTO

(75) Inventors: Bart Beers, Rumpt (NL); Franciscus van den Heuvel, Delft (NL)

(73) Assignee: Cyclomedia Technology B.V., Waardenburg (NL)

( * ) Notice: Subject to any disclaimer, the term of this patent is extended or adjusted under 35 U.S.C. 154(b) by 396 days.

(21) Appl. No.: 13/704,456

(22) PCT Filed: Jun. 29, 2011

(86) PCT No.: PCT/NL2011/050470
§ 371 (c)(1),
(2), (4) Date: Feb. 26, 2013

(87) PCT Pub. No.: WO2012/002811
PCT Pub. Date: Jan. 5, 2012

(65) Prior Publication Data
US 2013/0141549 A1 Jun. 6, 2013

(30) Foreign Application Priority Data
Jun. 29, 2010 (NL) ..................... 2004996

(51) Int. Cl.
*H04N 13/264* (2018.01)
*G01S 17/89* (2006.01)
(Continued)

(52) U.S. Cl.
CPC .......... *H04N 13/264* (2018.05); *G01S 17/89* (2013.01); *G03B 37/04* (2013.01); *G06T 17/05* (2013.01)

(58) Field of Classification Search
CPC ....................................................... H04N 7/18
(Continued)

(56) References Cited

U.S. PATENT DOCUMENTS 7,126,630 B1 * 10/2006 Lee .................. H04N 5/225
348/218.1
8,108,147 B1 * 1/2012 Blackburn .................... 701/301
(Continued)

OTHER PUBLICATIONS

Anglelov, D., et al., "Google Street View: Capturing the World at Street Level", *IEEE Computer Society*, vol. 43, No. 6, 2010, pp. 32-38.
(Continued)

*Primary Examiner* — Mohammed S Rahaman
*Assistant Examiner* — Jimmy S Lee
(74) *Attorney, Agent, or Firm* — The Webb Law Firm

(57) ABSTRACT

Method for producing a digital photo comprising pixels, wherein at least some of the pixels comprise position information, the method comprising of: taking a photo with a known geometry of the optical system with which the photo is taken; recording the position from which the photo has been taken; recording the direction in which the photo has been taken; providing a three-dimensional model comprising points which are comprised by at least an outer surface of an object in the field of view of the position where the photo has been taken, wherein the points comprise position information; relating a pixel on the one hand and a corresponding point in the three-dimensional model on the other; and recording, in a manner associated with the pixel, the position information of the corresponding pixel.

12 Claims, 7 Drawing Sheets

(51) Int. Cl.
*G03B 37/04* (2006.01)
*G06T 17/05* (2011.01)

(58) Field of Classification Search
USPC .......................................................... 348/46
See application file for complete search history.

(56) References Cited

U.S. PATENT DOCUMENTS

| | | | |
|---|---|---|---|
| 2002/0015103 A1 | 2/2002 | Shi | |
| 2005/0030378 A1* | 2/2005 | Stiller | B60R 1/00 348/148 |
| 2006/0193521 A1* | 8/2006 | England | G01S 7/51 382/190 |
| 2007/0076089 A1 | 4/2007 | DePue et al. | |
| 2007/0247612 A1 | 10/2007 | Pack et al. | |
| 2008/0075391 A1* | 3/2008 | Van Den Heuvel | G03B 37/04 382/284 |
| 2008/0221843 A1 | 9/2008 | Shenkar et al. | |
| 2010/0118116 A1* | 5/2010 | Tomasz | G01C 11/02 348/36 |
| 2010/0118122 A1* | 5/2010 | Hartman | G06T 15/20 348/46 |
| 2010/0149315 A1* | 6/2010 | Qu | A61B 1/00193 348/46 |
| 2011/0075257 A1* | 3/2011 | Hua | G02B 27/017 359/464 |
| 2011/0115615 A1* | 5/2011 | Luo | B60R 1/00 340/436 |
| 2011/0176000 A1* | 7/2011 | Budge | G06K 9/00771 348/143 |
| 2012/0274625 A1* | 11/2012 | Lynch | G06T 17/05 345/419 |

OTHER PUBLICATIONS

Xuexian, G., et al., "A Mobile System Using Lidar and Photogrammetry for Urban Spatial Objects Extraction", *2009 International Conference on Information Engineering and Computer Science,* IEEE Catalog No. CFP0990H, ISBN: 978-1-4244-4994-1, 2009, pp. 1-4.

PCT Application No. PCT/NL2011/050470, International Search Report and Written Opinion of the International Searching Authority dated Dec. 10, 2012.

PCT Application No. PCT/NL2011/050470, International Preliminary Report on Patentability and Written Opinion of the International Searching Authority dated Jan. 17, 2013.

* cited by examiner

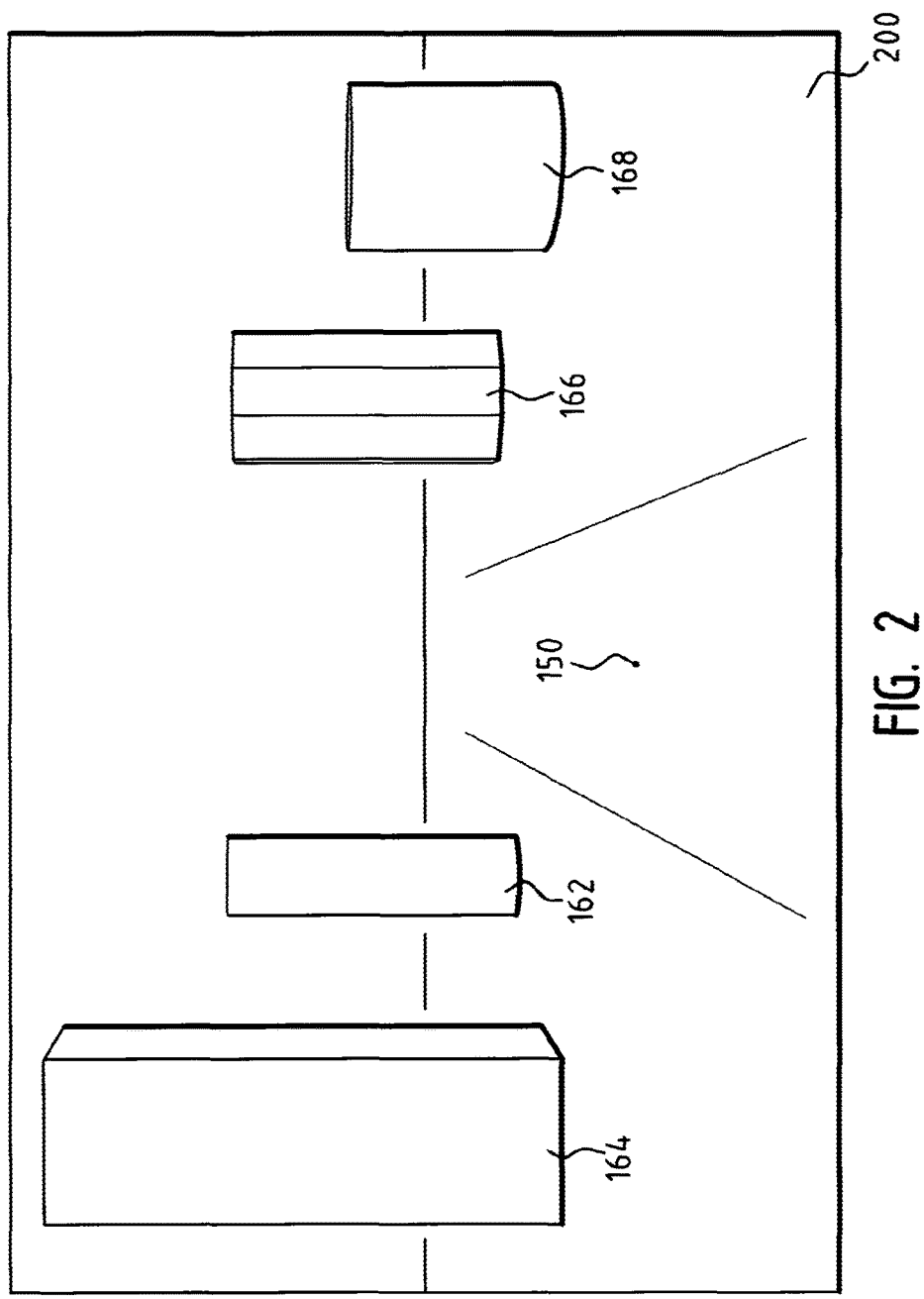

METHOD FOR PRODUCING A DIGITAL PHOTO WHEREIN AT LEAST SOME OF THE PIXELS COMPRISE POSITION INFORMATION, AND SUCH A DIGITAL PHOTO

CROSS-REFERENCE TO RELATED APPLICATIONS

This national stage patent application under 35 U.S.C. § 371 claims priority to PCT application no. PCT/NL2011/050470 filed Jun. 29, 2011, which claims priority to Netherlands patent application no. 2004996 filed Jun. 29, 2010, the disclosures of each of which are incorporated herein by reference for all purposes.

The present invention relates to a method for producing a digital photo comprising pixels, wherein at least some of the pixels comprise position information.

The present invention also relates to such a digital photo.

Applicant is engaged in the collection of digital images of the infrastructure and supplies this information to governments, estate agents, utility companies, banks, insurance companies and others for the purpose of evaluating local situations, for instance the location of property, the state of infrastructural facilities and local traffic situations. For this purpose applicant travels structured routes with cars having cameras mounted on the roof. As the vehicle drives along the cameras take photos of the surrounding area at fixed distances. The cars are equipped with a position-determining system in order to record the positions from which the photos are taken. A problem of the digital photos obtained in this manner is that in some situations they do not provide sufficient information about the position of pictured objects. Maps or drawings of the area, for instance cadastral maps, are therefore used in addition to the digital photos.

The present invention has for its object to provide a photo from which position information can be derived.

The present invention provides for this purpose a method for producing a digital photo comprising pixels, wherein at least some of the pixels comprise position information, the method comprising of: taking a photo with a known geometry of the optical system with which the photo is taken; recording the position from which the photo has been taken; recording the direction in which the photo has been taken; providing a three-dimensional model comprising points which are comprised by at least an outer surface of an object in the field of view of the position where the photo has been taken, wherein the points comprise position information; relating a pixel on the one hand and a corresponding point in the three-dimensional model on the other; and recording, in a manner associated with the pixel, the position information of the corresponding pixel.

Position information of a pixel of the photo is obtained by calculating on which pixel a point with position information from the three-dimensional model is imaged. The position from which the photo is taken is known, and therefore also the corresponding position in the three-dimensional model. Since the direction in which the photo is taken is recorded, and the geometry of the optical system with which the photo is taken and the pixel configuration of the photo is known, it is possible to determine for each pixel along which line in the three-dimensional model it is necessary to search for the point which corresponds to the pixel imaged in the photo. This line will generally not run exactly through a point of the three-dimensional model. A criterion is necessary for this purpose which is less strict than just a point lying on the line. In a specific embodiment it is possible instead to search for the point at the shortest distance to the position from which the photo has been taken and wherein the distance to the line lies below a threshold value. It is however necessary to be aware that, under the influence of a possible angular error, the distance to the line increases linearly with the distance to the point from which the photo has been taken. In an alternative embodiment points in the vicinity of the line are reconstructed to form a plane. The intersection of the line and the reconstructed plane is then determined.

The three-dimensional model is not limited to three-dimensional models comprising only individual points. Any model will suffice from which points can be derived, these points representing an outer surface or outer edge of an object. From a model comprising the outer surfaces of an object can be derived points which are located in these outer surfaces. These models can therefore be seen as models comprising an infinite number of points. These models are otherwise preferred to three-dimensional models comprising a limited number of individual points located in the outer surfaces, since the above described "less strict" criterion for finding an intersection of the line of sight and a point in the model is not necessary since a line which passes through a surface always has an exact intersection point. This type of model provided with position information is however difficult to obtain in practice, in contrast to three-dimensional models comprising individual points (see below). The present invention therefore also supports models comprising individual points.

The direction in which the photo is taken must in principle be recorded in the form of three angles, i.e. an angle in the horizontal plane, for instance relative to true north, an angle of inclination relative to the horizontal plane and a rotation angle around the optical axis. Depending on the use of the camera and/or the construction on which it is mounted in some embodiments, it is safe to assume in specific embodiments that the angle of inclination is substantially equal to zero and it suffices to record only the angle in the horizontal plane. For the sake of measurement precision however, it is recommended to record all three angles.

In another aspect according to the invention a method is provided further comprising the step of generating the three-dimensional model by means of a LIDAR device.

LIDAR (Light Detection and Ranging) is a technology similar to radar technology which is used to measure a contour profile of the Earth's surface. A laser beam scans the Earth's surface from an aircraft. The distance to the Earth's surface can be derived by measuring the time between emitting the laser beam and receiving the reflection. A contour profile can be constructed by scanning the Earth's surface with the laser beam and recording the direction in which the measurement is made. If the position of the LIDAR device is also known, it is possible to geocode the contour profile.

The LIDAR technology is suitable for constructing the three-dimensional models for the present invention. The LIDAR information is preferably not collected from the air but from the ground. Mainly collected from the air is information about horizontal surfaces. Relatively few reflection from the walls of buildings are received from the air, particularly in urban areas with many high-rise buildings. It is recommended to collect the LIDAR information from the ground from which the photos are also taken. Reflections are hereby received especially from the walls of buildings and other objects, precisely the parts of buildings and objects which generally also appear on the photos.

In a further aspect the invention comprises a method further comprising the steps of: extracting an object characteristic from the photo; extracting an object characteristic from the three-dimensional model; determining a corresponding pair of an object characteristic from the photo and an object characteristic from the three-dimensional model; determining a relative position error between the photo and the three-dimensional model by determining the distance between the position of an object characteristic in the photo and a corresponding object characteristic from the three-dimensional model; and correcting the position data of the photo and/or the three-dimensional model on the basis of the relative position error.

The position information in the three-dimensional model generally comprises position errors. In addition, a position found will also be made when determining from where the photo has been taken. The position error in the position information of the points in the three-dimensional model will further differ per point. This is because the positions of the points are determined from different positions. In for instance an urban area it is recommended to displace the LIDAR device through the different streets so as to thus include information about the different blocks in the model. The further the point was located from the LIDAR device, the greater the position error moreover becomes.

Pairs of corresponding object characteristics are found by extracting and comparing object characteristics from both the three-dimensional model and the photo. By subsequently comparing the position of these object characteristics in the photo to the corresponding object characteristics from the three-dimensional model it is possible to determine the relative position error between the photo and the three-dimensional model. A correction of this position error is then made to the position information of the photo and/or the three-dimensional model.

In a further aspect according to the invention a method is provided wherein correction of the position data comprises of correcting the position data of both the photo and the three-dimensional model on the basis of a weighting. It is not known beforehand whether the position error is in the position data of the photo or in the position data of the three-dimensional model. The position error will in practice be a combination of a position error in both. A correction is made to the position data of both the photo and the three-dimensional model by means of a weighting factor.

In a further embodiment the position error is determined by determining in the photo the angle between a minimum of three characteristics at which a corresponding characteristic has been found in the three-dimensional model. This angle can be determined because the geometry of the optical system with which the photo has been taken is known. On the basis of the known positions of the characteristics in the three-dimensional model it is now possible using resection to determine a position from which the photo has been taken. The position error is determined by comparing the thus determined position to the position recorded when the photo was taken.

In yet another aspect according to the present invention a method is provided wherein the weighting is determined by reliability information of the position determinations of the photo and/or the three-dimensional model. The greater the reliability of the position data of either the photo or the three-dimensional model, the higher the weighting factor applied for this position in calculating the optimum position data. In a specific embodiment at least one of the dilution of precision (DOP) values of the GPS is used in order to determine a reliability. In another specific embodiment the position determining system comprises a GPS with an inertial navigation system coupled thereto. The inertial navigation system provides a position when the GPS cannot determine a position, for instance as a result of the reception of the satellite signals between high-rise buildings, and for the purpose of the necessary accuracy in the position determination. The GPS supplies the inertial navigation system with reference positions for compensation of position drift. In this embodiment the reliability information is determined on the basis of the period of time since the inertial navigation system last received a reference position from the GPS. In yet another specific embodiment use is made of the DOP values as well as the period of time since receiving a reference position in order to determine the reliability. In an alternative embodiment the position determination is processed by means of a Kalman filter. In addition to an estimated actual value, the Kalman filter provides an estimate of the quality of the estimated actual value. This estimated quality is in turn used to determine the weighting factor for the position correction.

In a specific aspect according to the invention the intensity of the reflection is also recorded in the LIDAR data. In a further specific embodiment this intensity is used for the purpose, on the basis of the three-dimensional model in combination with the intensity data, of generating a two-dimensional projection from the viewpoint from which the photo has been taken. Corresponding characteristics are then once again determined in the photo and the two-dimensional projection, which display a great measure of visual similarity. Using the corresponding characteristics the position error is once again determined, after which it is corrected, with or without weighting.

In a further aspect according to the present invention a method is provided wherein the photo is taken from a vehicle while the vehicle is in motion. Traffic is impeded as little as possible during collection of data by taking the photo while the vehicle is in motion. In a specific embodiment a plurality of photos are taken in a plurality of directions using a plurality of cameras, these photos being stitched to form panoramic photos. The European patent application EP 1 903 534 of applicant describes a technology in which the movement of the vehicle is used to minimize the parallax error.

In an aspect according to the invention a method is provided wherein the vehicle is a car.

According to another aspect according to the invention, a method is provided wherein the LIDAR device is arranged on a vehicle and wherein the LIDAR data are collected while the vehicle is in motion.

In yet another aspect according to the invention a method is provided wherein the photo is taken from a vehicle other than the vehicle on which the LIDAR device is arranged.

The vehicle from which the photos are taken has the drawback that, depending on the amount of ambient light, the speed may not become too high since this results in motion blur in the photo. However, in an urban environment with many high-rise buildings, a high speed has a positive effect on the accuracy of the position determination. Owing to the high-rise the GPS will regularly be unable to do position determination because the signal from a number of satellites is blocked by buildings. At the moments that a signal is being received from sufficient satellites, the position will still regularly be inaccurate due to for instance multipath effects. This is where the inertial navigation system makes an important contribution by supplying accurate position information until a moment once again arrives when more accurate GPS positions are available. However, because an inertial navigation system is liable to drift, this may not last too long. A high speed enhances the position accuracy. A vehicle with a photo camera is however limited in its speed. This limitation does not however apply to a vehicle with a LIDAR device. By now having the vehicle with the LIDAR device travel at the highest possible speed and making use of the above described method for correcting position errors, a high position accuracy is obtained without motion blur occurring in the photos. It is however necessary here to take into account the fact that a higher speed produces a lower point density, since a LIDAR device generally has a fixed scanning frequency. In addition, the vehicle with the photo camera is limited to moments of the day when there is sufficient ambient light to take photos. The vehicle with the LIDAR device can however collect data 24 hours a day and even has an advantage when it travels at night, since it is likely to be able to travel at higher speed as there is less traffic.

The present invention provides a digital photo comprising pixels, wherein each pixel comprises at least one light intensity and at least some of the pixels comprise position information. This digital photo has the advantage that three-dimensionally measurements are made and spatial distances can be derived directly from the photo.

In a further embodiment the invention provides a digital photo wherein the position information comprises a distance from the position from which the digital photo has been taken. Although in an alternative embodiment the position information comprises three location coordinates, the above stated embodiment is more efficient since providing many pixels of three location coordinates results in much redundant information, and therefore considerably larger files. By storing only the distances from the camera position is also possible at a known field of view of the photo to calculate distances in the real world and between displayed pixels or angles between displayed lines. In a further embodiment the photo therefore also comprises the field of view of the photo.

In an alternative embodiment the invention provides a digital photo, wherein the position information comprises a relative position in relation to the position from which the digital photo has been taken.

In another alternative embodiment the present invention provides a digital photo, wherein the position information comprises a position relative to an external coordinate system.

In a further embodiment the present invention provides a digital photo, wherein the photo also comprises a reliability indicator for the position information. As described above, the reliability indicator is highly useful in the later correction of position errors.

In a further embodiment the invention provides a digital photo, wherein the pixels comprise the light intensity for three colour channels. In a specific embodiment the colour channels comprise a red, a green and a blue colour channel.

In a specific embodiment the invention provides a digital photo, wherein the photo comprises a field of vision of 360°. This photo can be obtained by making use of a fisheye lens, but can be obtained in alternative manner by stitching together the photos of two or more photo cameras.

Further advantages and embodiments are described below with reference to the accompanying figures, in which:

FIG. 2 is a schematic representation of a digital photo for processing to a digital photo according to the invention;

Figure 1A:
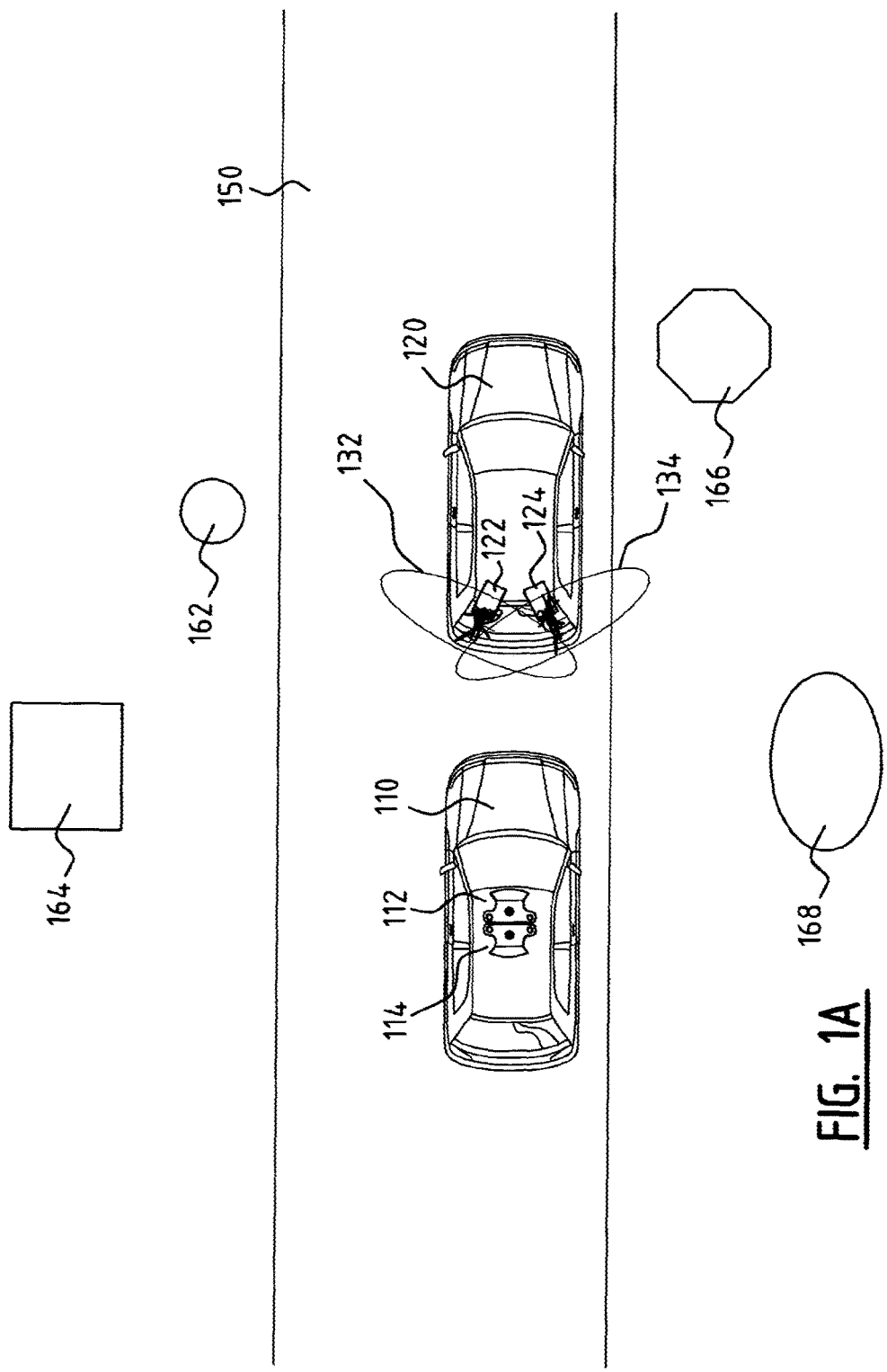
FIG. 1A is a top view of two vehicles as used in a method according to the present invention.
Figure 1B:
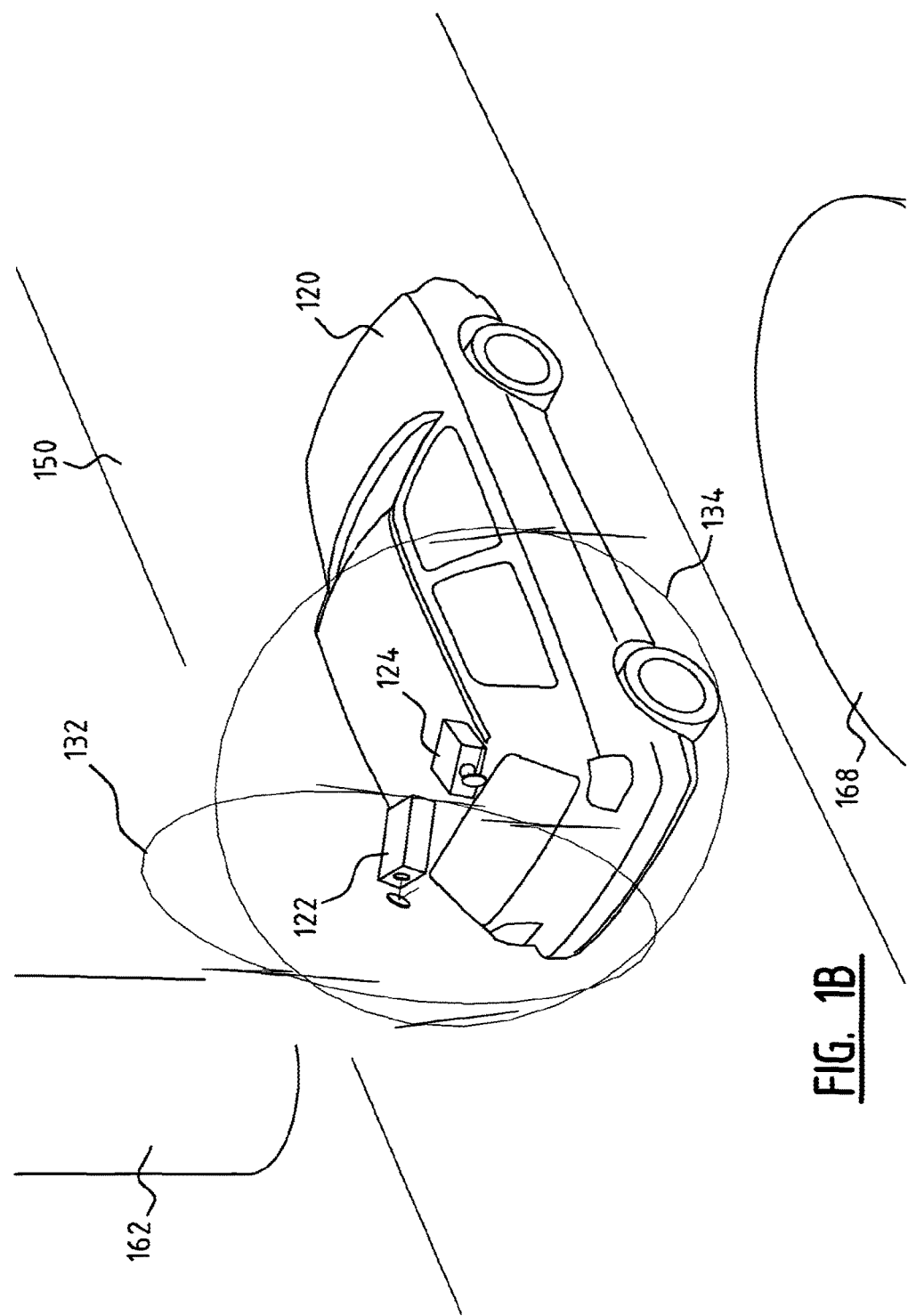
FIG. 1B is a perspective view of one of the vehicles of FIG. 1A.

A vehicle 110 (FIG. 1A) is provided with a first photo camera 112 and a second photo camera 114. Both cameras are mounted on the roof of the car and have a horizontal field of view of more than 180°, so that the images of the two photo cameras together produce a complete view around vehicle 110. First photo camera 112 is directed forward in the direction of travel. Second photo camera 114 is directed to the rear.

Vehicle 110 is further provided with a position determining device (not shown). In the exemplary embodiment this is a combination of a Global Positioning System, GPS, and an inertial position determining system. The inertial position determining system is responsible for accuracy and provides position information when the GPS is not capable of position determination. The GPS in turn provides for drift compensation in the inertial position determining system by providing reference positions.

Vehicle 110 travels over a road 150 in an area where objects 162, 164, 166, 168 are located, such as buildings, traffic signs, bus stops and the like. During travel the photo cameras 112, 114 take photos of the surrounding area. For each photo the position where the photo was taken is stored. Photo cameras 112 and 114 are preferably controlled such that, when second photo camera 114 takes a photo, the entrance pupil of second photo camera 144 is situated as close as possible to the position where the entrance pupil of first photo camera 112 was situated when it took a photo at a preceding point in time. It is possible in this way to merge the photos of photo cameras 112, 114 by means of stitching to form a panoramic photo with the smallest possible parallax error.

The resulting photo 200 (FIG. 2 shows a cropped perspective section) shows objects 162, 164, 166, 168 as recorded by photo camera 112.

A second vehicle 120 is provided with two LIDAR devices 122, 124. LIDAR devices 122, 124 generate a pulsing laser beam. A rotating mirror reflects the laser beam in a plane 132, 134 perpendicularly of the beam direction of the laser generator. LIDAR devices 122, 124 are placed such that the planes 132, 134 are vertical planes perpendicularly of the ground surface on which the vehicle stands, and such that the normal of the planes forms an angle of about respectively −45° and 45° to the main direction of travel of the vehicle in a plane parallel to the ground surface on which the vehicle stands. The angle ensures that LIDAR devices 122, 124 can also scan behind smaller objects situated along road 150. With a scanning direction perpendicularly of the direction of travel this type of object would form "shadows" behind which larger objects such as buildings remain partially concealed.

The rotating laser beams reflect on objects and the reflected laser light is reflected by the rotating mirrors to sensors in LIDAR devices 122, 124. The distance to the object is determined on the basis of the propagation time of the laser pulses from LIDAR device 122, 124 to the object and back again to LIDAR device 122, 124. Vehicle 120 is further provided with a position determining system in the form of a combination of a GPS and an inertial position determining system. Because the direction in which the laser pulse is emitted is further known, the position of the reflection point can be calculated.

Figure 3:
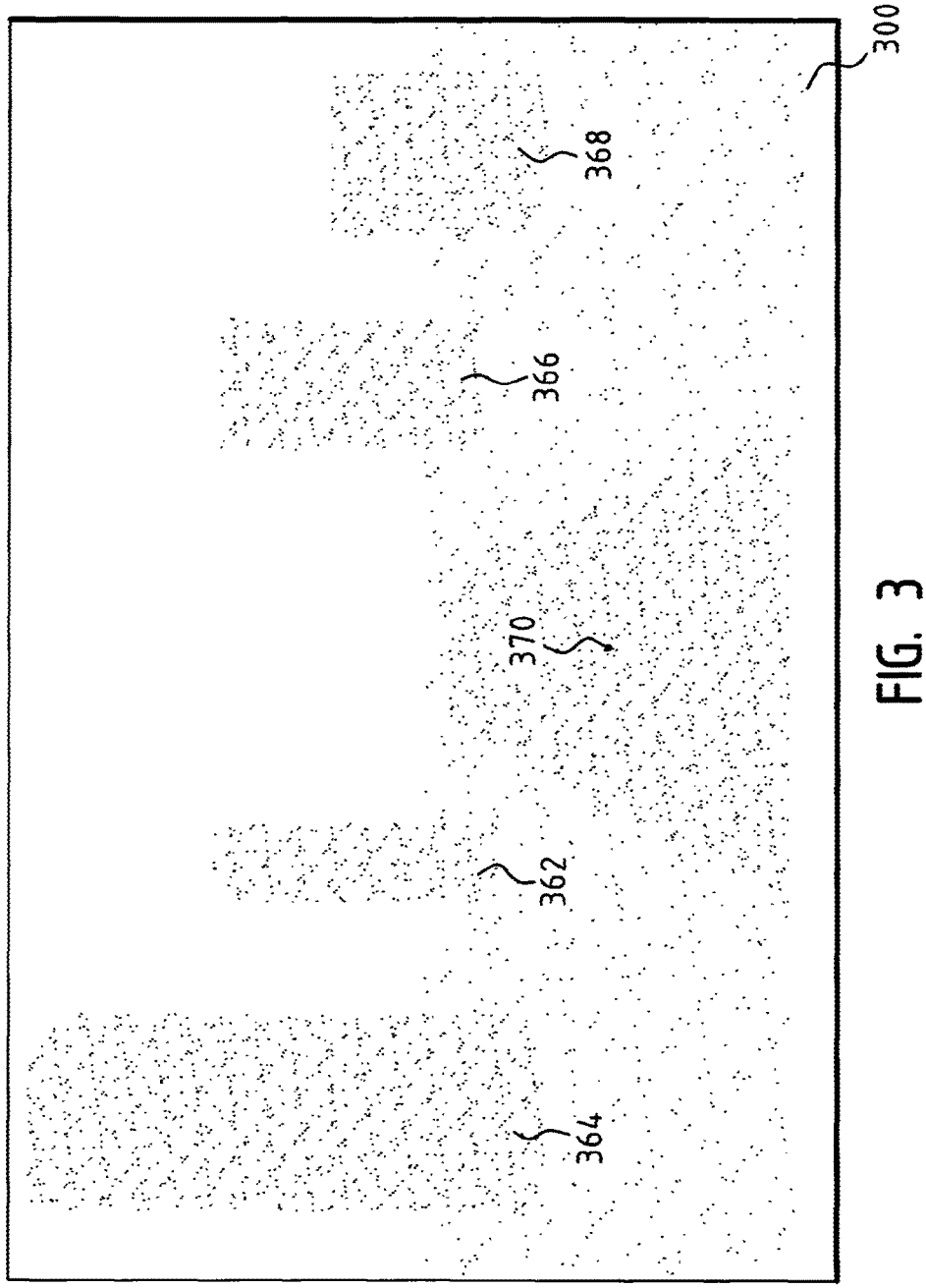
FIG. 3 is a schematic representation of a three-dimensional model as used in a method according to the present invention.

Because vehicle 120 is moving, LIDAR devices 122, 124 scan the surrounding area and a three-dimensional model 300 (FIG. 3) of the area is formed. The representation in FIG. 3 is from the same point of view as the photo of FIG. 2. This is however a three-dimensional model and there is as such no specific point of view linked to the model. Objects 162, 164, 166, 168 appear in the three-dimensional model 300 as the point clouds 362, 364, 366, 368. Ground surface 370 further appears in the three-dimensional model.

Figure 4:
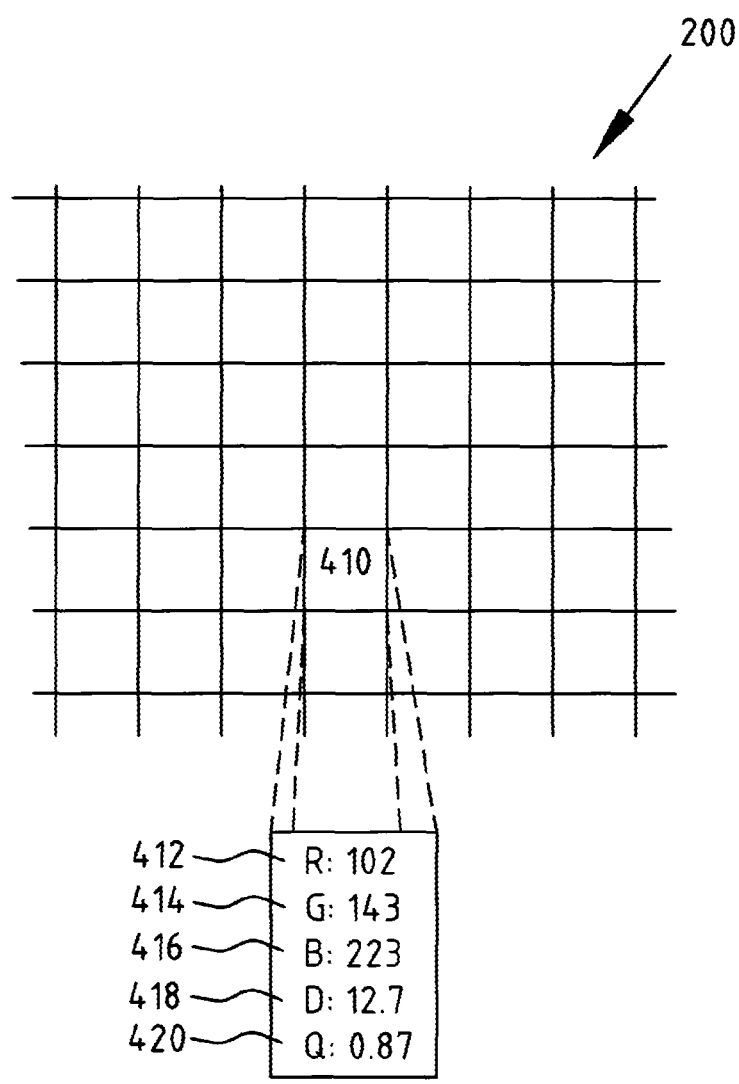
FIG. 4 is a schematic representation of a detail of a digital photo according to the invention.

A digital photo 200 is then provided with depth information (FIG. 4). Each pixel 410 of photo 200, in addition to being provided with the three conventional colour channels red 412, green 414 and blue 416, is also provided with a depth channel 418. This depth channel indicates the distance of the position of the point imaged in pixel 410 to the position from which the photo was taken. In addition to depth channel 418, pixel 410 is further provided with a quality channel 420, this quality channel 420 indicating the quality or reliability of the depth information in depth channel 418.

Figure 5:
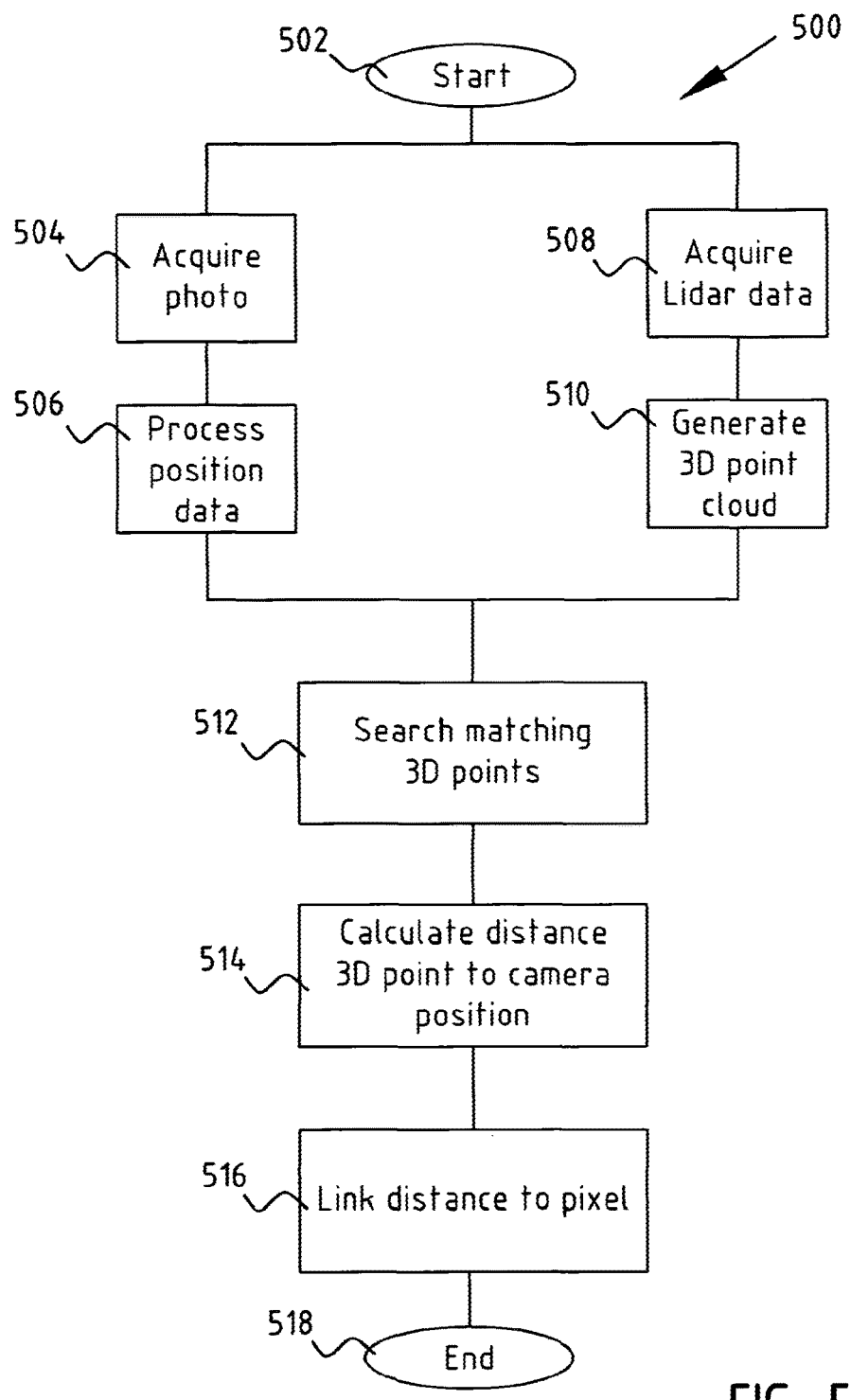
FIG. 5 shows a flow diagram of a method according to the present invention.

This process is further described in flow diagram 500 (FIG. 5). After startup 502 of the process a photo 200 is obtained 504 with associated position data 506 as described above. Using the LIDAR devices 122, 124 LIDAR data are also obtained 508 in the form of propagation times of the laser pulses in combination with a position of the LIDAR device and a direction in which the laser pulse is emitted. The three-dimensional model 300 is formed 510 on the basis of the LIDAR data, this model comprising a point cloud (generally with a plurality of clusters of points, wherein each cluster represents an object 162, 164, 166, 168 such as a building).

In a following step a determination 512 is made for each pixel as to which point in the three-dimensional model 300 corresponds most to the pixel. The distance to the imaged point is then determined 514 on the basis of the position of the found pixel and the position from which photo 200 was taken. Finally, this distance is stored 516 in the pixel in the photo, after which the method is ended.

Figure 6:
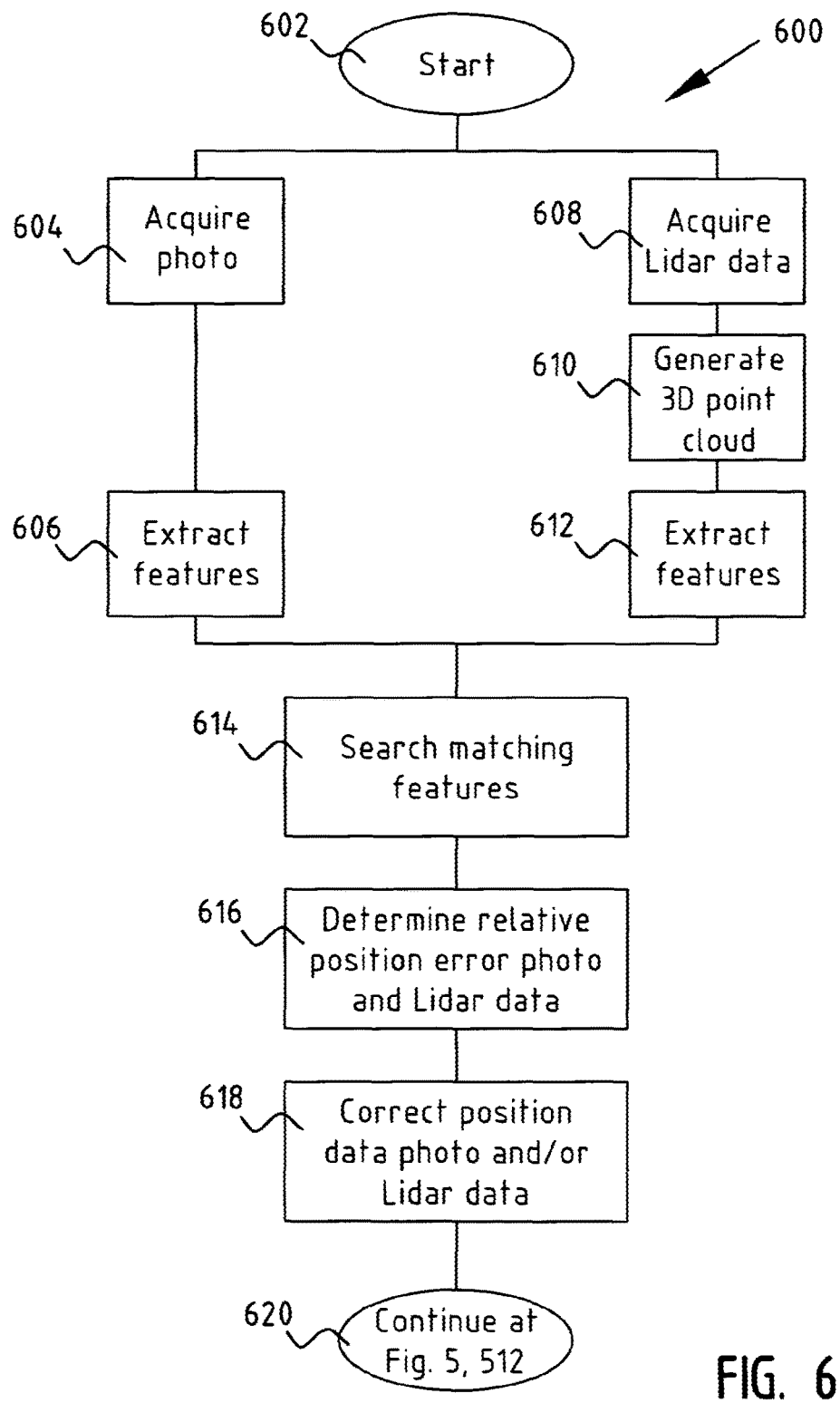
FIG. 6 shows a flow diagram of a further method according to the present invention.

FIG. 6 shows a method 600 for correcting possible position errors in the position of photo 200 or the position of the points in three-dimensional model 300. This method can per se be utilized independently to correct or reduce position errors, but is particularly suitable for performing in integrated manner with method 500 in order to increase the accuracy of the depth data. To this end the final step, step 620, of this flow diagram 600 refers to step 512 in flow diagram 500.

Following startup 602 of the method, as in the above method 500, a photo 200 is obtained 604 with associated position information. Visual characteristics, such as vertical contrast transitions or angles in contrasting planes, are then extracted 606 from this photo. There is a good chance that such characteristics represent for instance corners of buildings or lampposts.

In addition, LIDAR data are also obtained 608 (see also method 500 above), on the basis of which a three-dimensional model 300 is generated 610. Characteristics such as corners of objects 162, 164, 166, 168 are then also extracted 612 from the three-dimensional model.

In a subsequent step a search 614 is made for corresponding characteristics in photo 200 and three-dimensional model 300. The corresponding characteristics are determined by making use of resection. Of the characteristics from photo 200 a provisional position is in the first instance determined on the basis of the above described method 500. The relative position error is then determined 616 between the position of the characteristic in three-dimensional model 300 and the provisional position of the corresponding characteristic in photo 200.

The position of photo 200 and the position of the points of the characteristic in the three-dimensional model are then corrected 618 on the basis of a weighting factor. The weighting factor is determined by a reliability indicator of the position determinations of respectively photo 200 and three-dimensional model 300 (or more precisely the points in the model corresponding to the characteristic). This reliability indicator is for instance determined on the basis of the recorded dilution of precision information of the GPS and how recently the inertial position determining system has been corrected for drift.

Account also has to be taken of the fact that the points in three-dimensional model 300 are based on measurements taken at different moments, and the position errors and reliability indicators are not therefore the same for all points in model 300.

Once the positions of photo 200 and the points in three-dimensional model 300 have been corrected, this method 600 for correcting position errors is ended. As described above, it will then normally be wished to determine the definitive position of the pixels in photo 200 by applying steps 510 to 518.

The embodiments described and shown here are only exemplary embodiments and serve only to illustrate the present invention. It will be immediately apparent to the skilled person that many modifications are possible within the invention. It is thus of course possible to combine the features of the described and shown embodiments in order to obtain new embodiments. These new embodiments also fall within the present invention. The scope of protection sought is therefore not limited to the shown and described embodiments but is defined solely by the following claims.

The invention claimed is:

1. A method for producing a digital photo comprising pixels, wherein at least some of the pixels comprise position information, the method comprising of:
   a) taking a first photo with a known geometry of the optical system with which the first photo is taken;
   b) recording the position from which the first photo has been taken;
   c) recording the direction in which the first photo has been taken;
   d) using a LIDAR device for providing a three-dimensional model comprising points, each point comprising position information, and wherein the points each correspond to a respective reflection point on an outer surface of an object from which reflection point a laser beam from the LIDAR device has been reflected back to the LIDAR device;
   e) for each pixel in the photo:
      determining, in dependence of the position and direction recorded for that first photo, a line that runs through said each pixel and the position from which the first photo has been taken;
      searching for a point in the three-dimensional model that relates to the same respective reflection point as said each pixel, based on a distance between such point and the line;
      if a point in the three-dimensional model is found that relates to the same reflection point, calculating a distance to be associated with said each pixel using the distance between the reflection point that corresponds to the point found in said three-dimensional model and the position from which the first photo has been taken; and storing the distance in association with said pixel of said first photo.

2. The method as claimed in claim 1, wherein said searching and finding said point using said line comprises:

determining which point of the three-dimensional model is at the shortest distance to the position from which the photo has been taken while the distance from this point to the line lies below a threshold value; or reconstructing a plane using points of the three-dimensional model that are in the vicinity of the line and determining the point as the intersection of the line and the reconstructed plane.

3. The method as claimed in claim 1, wherein the method comprises using a first and second photo camera for recording respective photos according to step a), and comprises performing step b) and c) for each recorded photo, wherein the digital photo is constructed by stitching the photos obtained by the first and second photo camera.

4. The method as claimed in claim 3, wherein the field of view of the digital photo comprises a field of vision of 360 degrees.

5. The method as claimed in claim 4, wherein the first and second camera are mounted on a vehicle, wherein the photos are taken from the vehicle while the vehicle is in motion;

wherein the first and second camera are controlled such that, when the second photo camera takes a photo, the entrance pupil of the second photo camera is situated as close as possible to the position where the entrance pupil of the first photo camera was situated when it took a photo at a preceding point in time.

6. The method as claimed in claim 1, the method further comprising:

extracting a corresponding pair of object characteristics from the photo and the three-dimensional model;

comparing the position of the extracted object characteristics in the photo to the position of the corresponding extracted object characteristics in the three-dimensional model;

determining a relative position error between the photo and the three-dimensional model based on said comparison; and correcting the position from which the photo has been taken and/or the position information of the three-dimensional model based on said relative position error.

7. The method as claimed in claim 6, wherein correction of the position comprises correcting the position data of both the photo and the three-dimensional model on the basis of a weighting.

8. The method as claimed in claim 7, wherein the weighting is determined by reliability information of the position determinations of the photo and/or the three-dimensional model.

9. The method as claimed in claim 5, wherein the vehicle is a car.

10. The method as claimed in claim 1, wherein the LIDAR device is arranged on a vehicle and wherein the points are collected while the vehicle is in motion.

11. The method as claimed in claim 10, wherein the photo is taken from a vehicle other than the vehicle on which the LIDAR device is arranged.

12. The method as claimed in claim 1, each pixel comprising a plurality of color channels and a depth channel, in which depth channel said distance is indicated.

* * * * *